(12) United States Patent
Mack et al.

(10) Patent No.: US 10,714,720 B2
(45) Date of Patent: Jul. 14, 2020

(54) VENT HOUSING FOR ADVANCED BATTERIES

(71) Applicant: CPS Technology Holdings LLC, New York, NY (US)

(72) Inventors: Robert J. Mack, Milwaukee, WI (US); William M. Cavanaugh, Sussex, WI (US)

(73) Assignee: CPS Technology Holdings, LLC, New York, NY (US)

( * ) Notice: Subject to any disclaimer, the term of this patent is extended or adjusted under 35 U.S.C. 154(b) by 0 days.

(21) Appl. No.: 15/915,056

(22) Filed: Mar. 7, 2018

(65) Prior Publication Data

US 2018/0198103 A1  Jul. 12, 2018

Related U.S. Application Data

(62) Division of application No. 14/339,357, filed on Jul. 23, 2014, now Pat. No. 9,947,908.

(60) Provisional application No. 61/858,355, filed on Jul. 25, 2013.

(51) Int. Cl.
*H01M 2/12* (2006.01)
*H01M 2/04* (2006.01)

(52) U.S. Cl.
CPC ........... *H01M 2/1205* (2013.01); *H01M 2/12* (2013.01); *H01M 2/1223* (2013.01); *H01M 2/1264* (2013.01); *H01M 2/043* (2013.01); *H01M 2/1235* (2013.01); *H01M 2/1252* (2013.01); *H01M 2220/20* (2013.01)

(58) Field of Classification Search
CPC .... H01M 2/1205; H01M 2/12; H01M 2/1223; H01M 2/1294; H01M 2/1241; H01M 2/1264; H01M 2/043; H01M 2/1235; H01M 2220/20; H01M 2/1252; F16K 24/00
See application file for complete search history.

(56) References Cited

U.S. PATENT DOCUMENTS

| 5,916,704 | A | 6/1999 | Lewin |
| 6,025,086 | A | 2/2000 | Ching |
| 6,068,945 | A | 5/2000 | Moll |
| 7,655,347 | B2 | 10/2010 | Nishide et al. |
| 7,807,282 | B2 | 10/2010 | Hamada et al. |

(Continued)

FOREIGN PATENT DOCUMENTS

| CN | 201307612 Y | 9/2009 |
| EP | 0834935 A1 | 4/1998 |

(Continued)

OTHER PUBLICATIONS

US 8,673,474 B2, 03/2014, Harada et al. (withdrawn)
International Search Report and Written Opinion for PCT Application No. PCT/US2014/048076 dated Sep. 24, 2014; 8 pgs.

*Primary Examiner* — Alexander Usyatinsky
(74) *Attorney, Agent, or Firm* — Boardman & Clark LLP

(57) ABSTRACT

A system includes a vent housing configured to be installed on a lower housing of a battery module at a first side of the vent housing. The vent housing has a main body having an opening on a second side of the vent housing and an internal chamber coupled to the opening. The internal chamber includes a first wall having an internal burst vent configured to open at a first pressure threshold and a second wall having a ventilation vent comprising a gas-selective permeability layer.

10 Claims, 4 Drawing Sheets

(56) References Cited

U.S. PATENT DOCUMENTS

| | | | |
|---|---|---|---|
| 8,182,934 B2 | 5/2012 | Asahina et al. | |
| 8,404,372 B2 | 3/2013 | Pei | |
| 2002/0061434 A1* | 5/2002 | Holden | H01M 2/127 |
| | | | 429/54 |
| 2003/0087146 A1 | 5/2003 | Chi | |
| 2005/0147872 A1 | 7/2005 | Davidson | |
| 2009/0311607 A1* | 12/2009 | Han | H01M 2/04 |
| | | | 429/246 |
| 2011/0212348 A1* | 9/2011 | Yasui | H01M 2/1077 |
| | | | 429/7 |
| 2012/0015218 A1* | 1/2012 | Lee | H01M 2/1223 |
| | | | 429/53 |
| 2012/0282499 A1* | 11/2012 | Eichinger | H01M 2/1235 |
| | | | 429/56 |
| 2012/0315514 A1 | 12/2012 | Guo | |
| 2013/0164567 A1* | 6/2013 | Olsson | H01M 10/488 |
| | | | 429/7 |

FOREIGN PATENT DOCUMENTS

| | | |
|---|---|---|
| EP | 2410592 A1 | 1/2012 |
| JP | 2013089375 A | 5/2013 |
| WO | 9919919 A1 | 4/1999 |
| WO | 2005050759 A2 | 6/2005 |

* cited by examiner

VENT HOUSING FOR ADVANCED BATTERIES

CROSS REFERENCE TO RELATED APPLICATIONS

This application is a divisional of U.S. patent application Ser. No. 14/339,357, entitled "Vent Housing For Advanced Batteries", filed on Jul. 23, 2014, now U.S. Pat. No. 9,947,908, which claims priority from and the benefit of U.S. Provisional Application Ser. No. 61/858,355, entitled "Vent Housing For Advanced Batteries", filed on Jul. 25, 2013, now expired, each of which is incorporated by reference herein in their entirety for all purposes.

BACKGROUND

The present disclosure relates generally to the field of batteries, battery modules, and battery housings. More specifically, the present disclosure relates to battery housings for battery modules that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of PHEVs.

As xEV technology continues to evolve, there is a need to provide improved power sources (e.g., battery systems or modules) for such vehicles. For example, it is desirable to increase the distance that such vehicles may travel without the need to recharge the batteries. Additionally, it may also be desirable to improve the performance and reliability, and reduce the maintenance associated with such batteries.

One example of a battery module useful for the applications described above is one that includes multiple lithium ion electrochemical cells and other features for managing the operation of the cells under various conditions. Indeed, the ability of lithium ion electrochemical cells to be charged faster and in a more reproducible manner than other battery technologies (e.g., lead-acid electrochemical cells, nickel-cadmium electrochemical cells) makes them particularly suited to address various power requirements of the applications noted above. In this regard, many xEV applications include battery modules based on lithium ion technology, either alone or in combinations with other energy storage and supply technologies (e.g., ultracapacitors, lead-acid batteries).

The lithium ion electrochemical cells generally include non-aqueous liquids (e.g., aprotic organic solvents) as their electrolyte liquids, for example due to the incompatibility of lithium metal with water. In this regard, each electrochemical cell will generally include its own casing used to contain its specific components (e.g., electrodes, electrolyte fluids). Also, the lithium ion electrochemical cells and, in some instances, a housing of the battery modules containing these cells, may be hermetically sealed to limit exposure of the electrochemical cells and their internal components to moisture.

During operation (e.g., charging and discharging), the lithium ion electrochemical cells may become heated as a result of various electrochemical and thermodynamic processes occurring within the cells. This heat may cause the electrolyte liquids, among other things, to expand and in some situations volatilize, which in turn raises the internal pressure of the electrochemical cell and causes the individual casing of the electrochemical cells to expand. Further, as the lithium ion electrochemical cells experience an increase in internal pressure, they may begin to vent certain gases. For example, vented gases may include, but are not limited to, volatilized electrolyte.

For this reason, lithium ion electrochemical cells may be designed to withstand a certain amount of expansion, and may also include various interconnects or other features for venting gases into the battery module. Despite these approaches, in some instances, the degree of heating, or some other force placed upon lithium ion electrochemical cells, may be sufficient to cause one or more of the lithium ion electrochemical cells to vent a relatively large volume of gases into the housing of the battery module. To prevent rupture of the housing of the battery module, these gases may need to be vented as well.

Battery modules, therefore, may include a vent that is either connected to a vent tube in a vehicle or is sealed with a valve, or both, which enables the release of these gases from the battery module and into the vent tube of the vehicle or the ambient environment. However, it is presently recognized that the vents associated with such modules may be subject to further improvement, for example if the housing of a battery module were to enable directional venting of the gases, and/or multiple venting operations.

SUMMARY

Certain embodiments commensurate in scope with the originally disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery modules. More specifically, the present disclosure relates to housing for battery modules. Particular embodiments are directed to lithium ion battery cells that may be used in vehicular contexts (e.g., xEVs) as well as other energy storage/expending applications (e.g., energy storage for an electrical grid). Still more particularly, present embodiments relate to a housing for venting gases out of a battery module that includes, for example, lithium ion electrochemical cells. For example, an electrochemical cell may produce one or more gases that, through the normal course of operation, are slowly released from the battery cell. Other times, the electrochemical cell may produce an excess of gases that are released much more quickly, and which must be directed out of the battery module. In such instances, a burst vent of a vent housing may open to release and direct the excess gases away from the battery module, for example in a predetermined direction.

In an embodiment, a system includes a vent housing configured to be installed on a lower housing of a battery module at a first side of the vent housing. The vent housing has a main body having an opening on a second side of the vent housing and an internal chamber coupled to the opening. The internal chamber includes a first wall having an internal burst vent configured to open at a first pressure threshold and a second wall having a ventilation vent comprising a gas-selective permeability layer.

In another embodiment, a system includes a lower housing sized to hold a plurality of lithium-ion electrochemical cells and having a first connection surface, and a vent housing configured to couple with the lower housing. The vent housing includes a main body having a second connection surface configured to mate with the first connection surface, an opening in a face of the main body, the face being oriented generally crosswise relative to the second connection surface, and an internal chamber coupled to the opening and having an internal burst vent and a ventilation vent. The ventilation vent comprises a gas-selective permeability layer.

In another embodiment, a system includes a lower housing holding a plurality of lithium-ion electrochemical cells, and a vent housing coupled to the lower housing such that the cavity is sealed at an internal pressure. The vent housing includes a main body having an opening on a face of the vent housing, and an internal chamber coupled to the opening. The internal chamber includes a first wall having an internal burst vent configured to open when the internal pressure rises above a first pressure threshold, and a second wall having a ventilation vent configured to enable gas exchange between the internal chamber and the cavity.

DRAWINGS

These and other features, aspects, and advantages of the present disclosure will become better understood when the following detailed description is read with reference to the accompanying drawings in which like characters represent like parts throughout the drawings, wherein.

Figure 4:
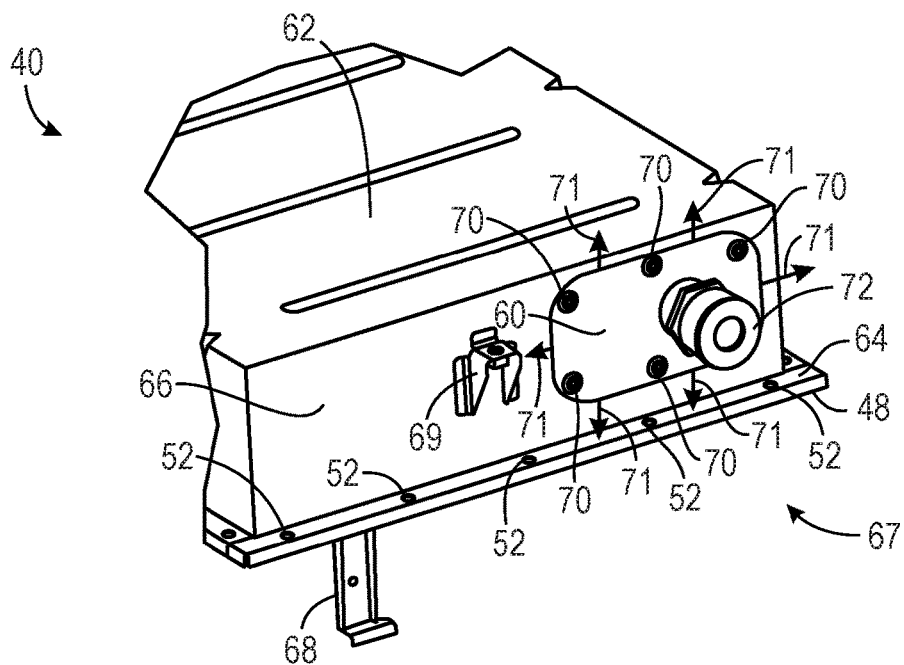
FIG. 4 is a perspective view of an embodiment of the vent housing of FIG. 3, the vent housing having a hose connector on a face plate of the vent housing in accordance with an embodiment of the present disclosure.
Figure 5:
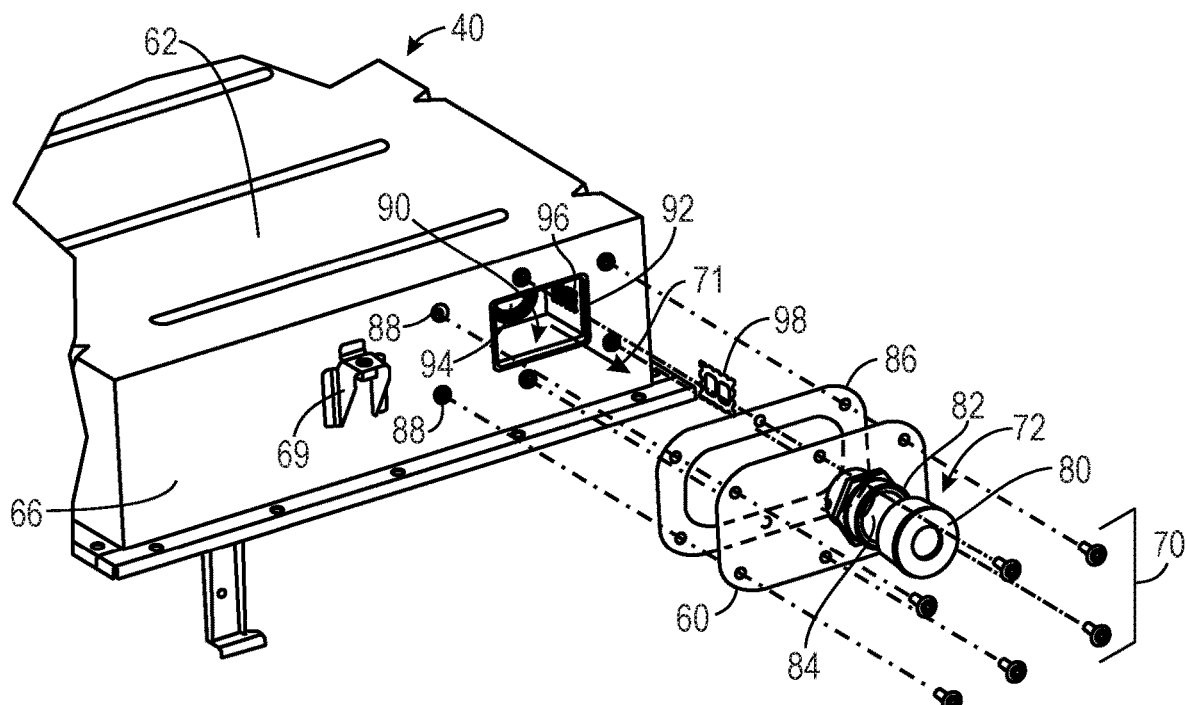
Figure 6:
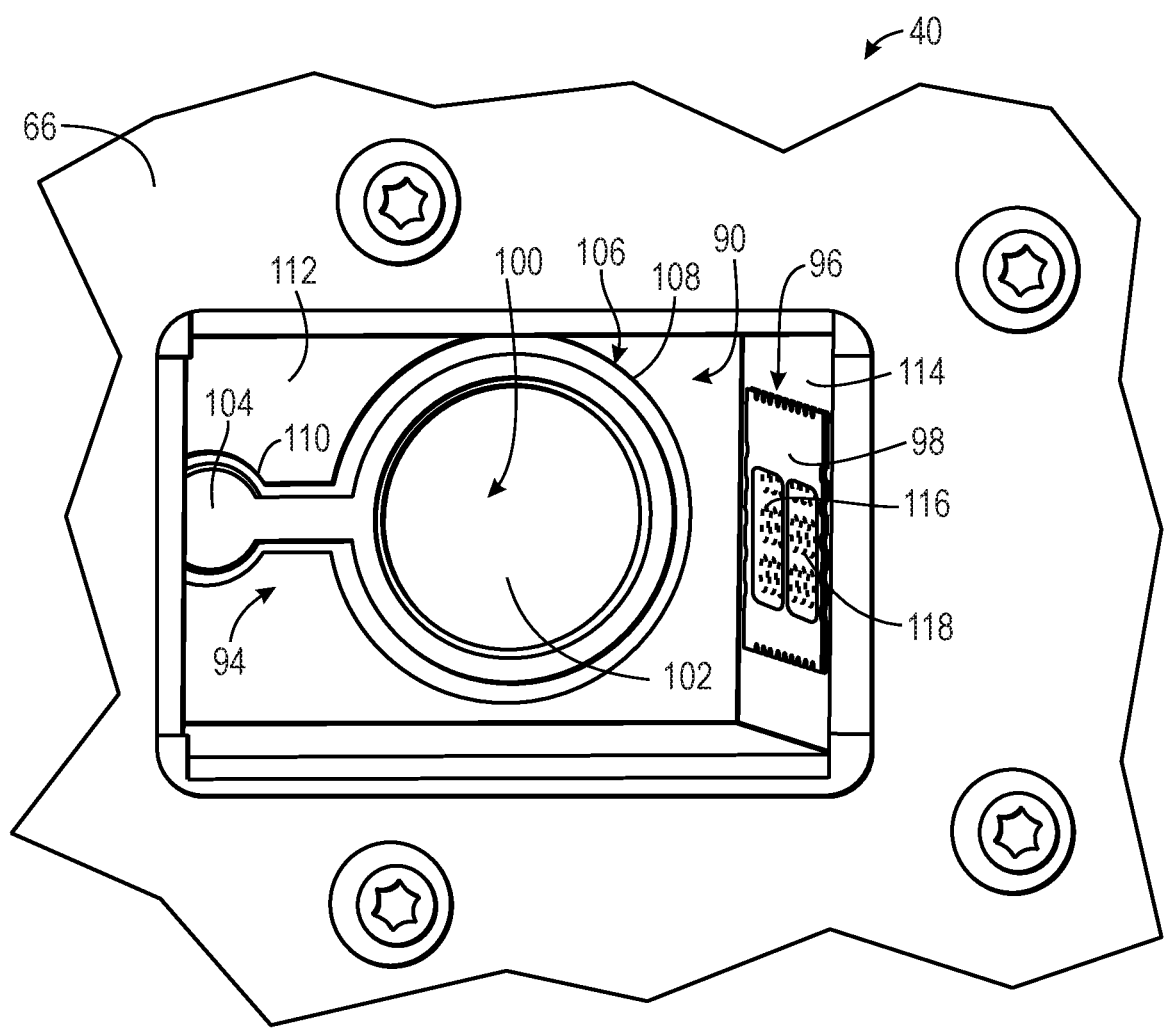

FIG. 5 is an exploded view of the vent housing of FIG. 4 depicting the manner in which a face plate and the hose connector are arranged relative to a main body of the vent housing, in accordance with an embodiment of the present disclosure; and FIG. 6 is an expanded partial view of an embodiment of an internal chamber of the vent housing of FIG. 5, the internal chamber having an internal burst vent and a ventilation vent configured in accordance with an embodiment of the present disclosure.

DETAILED DESCRIPTION

It should be noted that terms such as "above", "below", "on top of", and "beneath" may be used to indicate relative positions for elements (e.g., stacked components of the power and battery assemblies described below) and are not limiting embodiments to either of a horizontal or vertical stack orientation. Further, should be noted that terms such as "above", "below", "proximate", or "near" are intended to indicate the relative positions of two layers in the stack that may or may not be in direct contact with one another. Additionally, geometric references are not intended to be strictly limiting. For example, use of the term "perpendicular" does not require an exact right angle, but defines a relationship that is substantially perpendicular, as would be understood by one of ordinary skill in the art. Similarly, for example, the term "parallel" used in reference to geometric relationships does not require a perfect mathematical relationship but indicates that certain features are generally extending in the same directions. Additionally, the term "planar" is used to describe features that are substantially flat, but does not require perfect mathematical planarity.

As set forth above, the battery systems described herein may be used to provide power to a number of different types of xEVs as well as other energy storage applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. As also described above, the various venting processes that may occur in such a battery module may, in some situations, require relatively large volumes of gases to be expelled from the battery module.

The present disclosure addresses these and other issues by providing, among other things, a vent housing for a battery module (e.g., a lithium ion battery module) that includes features configured to enable both rapid venting of gases that may be produced by the electrochemical cells as well as a relatively slower venting of other gases. By way of non-limiting example, the vent housing may correspond to an upper part of a battery module housing, and may be shaped and sized to mate with a lower housing sized and shaped to contain a plurality of lithium ion electrochemical cells. The vent housing may include, for example, one or more burst vents, face plates, internal chambers, hose connections, and the like, that enable both a rapid release of vent gases when appropriate (e.g., when sufficient quantities of gas are released into the battery module from the electrochemical cells), as well as directional venting of these gases in a predetermined direction. In this way, the vent gases may be directed away from, for example, a passenger cabin of a vehicle. The vent housing may also include one or more gas-selective permeability vents that are configured to enable a slower release of certain vent gases, in essence allowing the battery module and its associated electrochemical cells to "breathe." For example, the gas-selective permeability vents may enable gas exchange across a membrane, but do not allow moisture or condensation to pass through.

Figure 1:
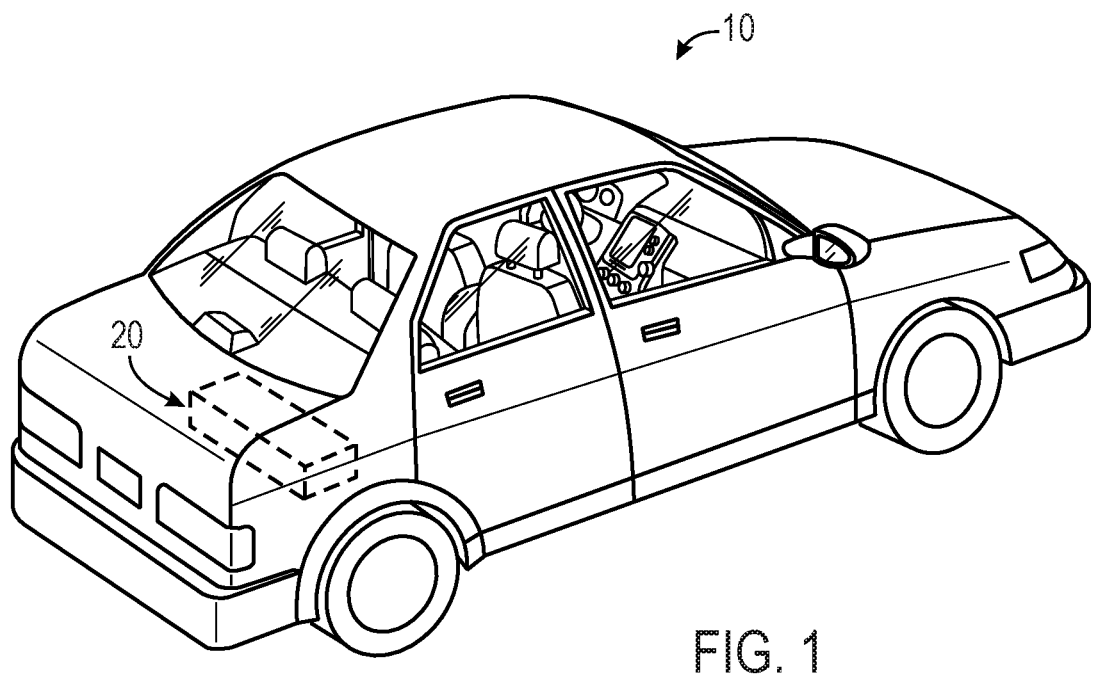
FIG. 1 is a perspective view of a vehicle (an xEV) having a battery system contributing all or a portion of the power for the vehicle, in accordance with an embodiment of the present disclosure.

While it is envisioned that the embodiments noted above and described in further detail below may be applied to any battery subject to venting as described herein, the present approaches are particularly applicable to lithium ion battery modules that are subject to the various environmental and operating conditions associated with, for example, driving a vehicle. With this in mind, FIG. 1 is a perspective view of an embodiment of an xEV 10 in the form of an automobile (e.g., a car) having a battery system 20, where the battery system 20 may provide all or a portion of the power (e.g., electrical power and/or motive power) for the vehicle 10, as described above. As described in more detail below, the battery system 20 may include one or more battery modules each having a vent housing that employs one or more vents to release gases produced during operation or charging of the battery system 20.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 20 is illustrated in FIG. 1 as being positioned in the trunk or rear of the vehicle, according to other embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations. Indeed, it is now recognized that no matter where the battery system 20 is positioned, it may be desirable for the vent housings as described herein to directionally vent gases away from the passenger area of the xEV 10. However, it is also recognized that non-directional venting may also be appropriate in certain circumstances.

Figure 2:
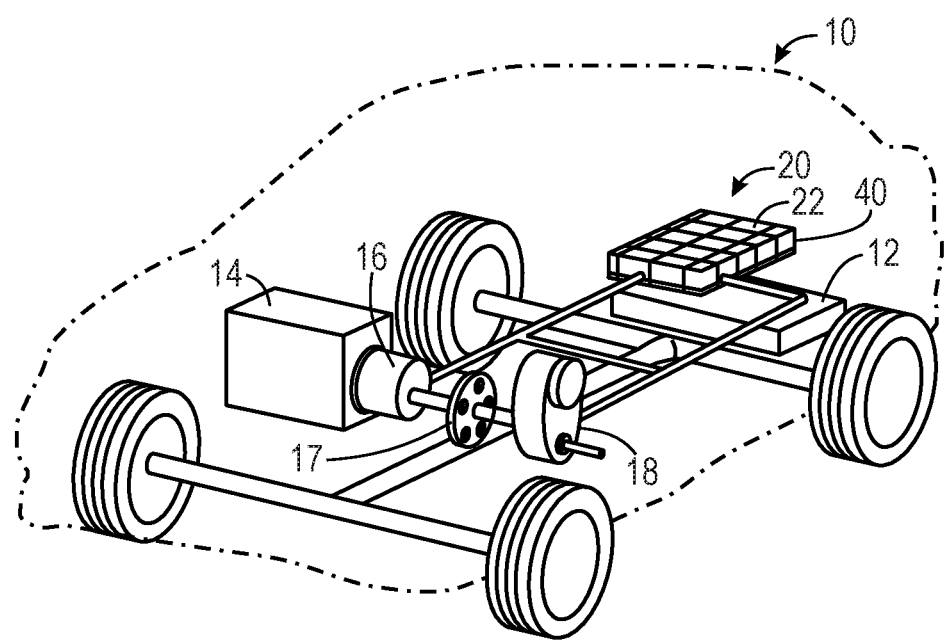
FIG. 2 is a cutaway schematic view of the xEV embodiment of FIG. 1 in the form of a hybrid electric vehicle (HEV) having a battery module with a vent housing, in accordance with an embodiment of the present disclosure.

Certain features of the battery system 20 and associated components may be further appreciated with reference to FIG. 2, which illustrates a cutaway schematic view of an embodiment of the xEV 10 in the form of an HEV having the battery system 20. The illustrated battery system 20 includes a plurality of battery modules 22, though there may be only one battery module 22 in other embodiments. In particular, the battery system 20 illustrated in FIG. 2 is disposed toward the rear of the vehicle 10 proximate a fuel tank 12. In other embodiments, the battery system 20 may be provided immediately adjacent the fuel tank 12, provided in a separate compartment in the rear of the vehicle 10 (e.g., a trunk), or provided in another suitable location in the xEV 10. As may be appreciated, it may be desirable to vent gases away from any one or a combination of these vehicle features, as well. Further, as illustrated in FIG. 2, an internal combustion engine 14 may be provided for times when the xEV 10 utilizes gasoline power to propel the vehicle 10. The vehicle 10 also includes an electric motor 16, a power split device 17, and a generator 18 as part of the drive system.

The one or more battery modules 22 of the battery system 20 may each include a plurality of battery cells (e.g., lithium ion electrochemical cells), which may be subject to the venting processes described above. Further, the battery system 20 may include features or components for connecting the multiple battery modules 22 to each other and/or to other components of the vehicle electrical system. For example, the battery system 20 may include features that are responsible for monitoring and controlling the electrical and thermal performance of the one or more battery modules 22 and its associated electrochemical cells.

Figure 3:
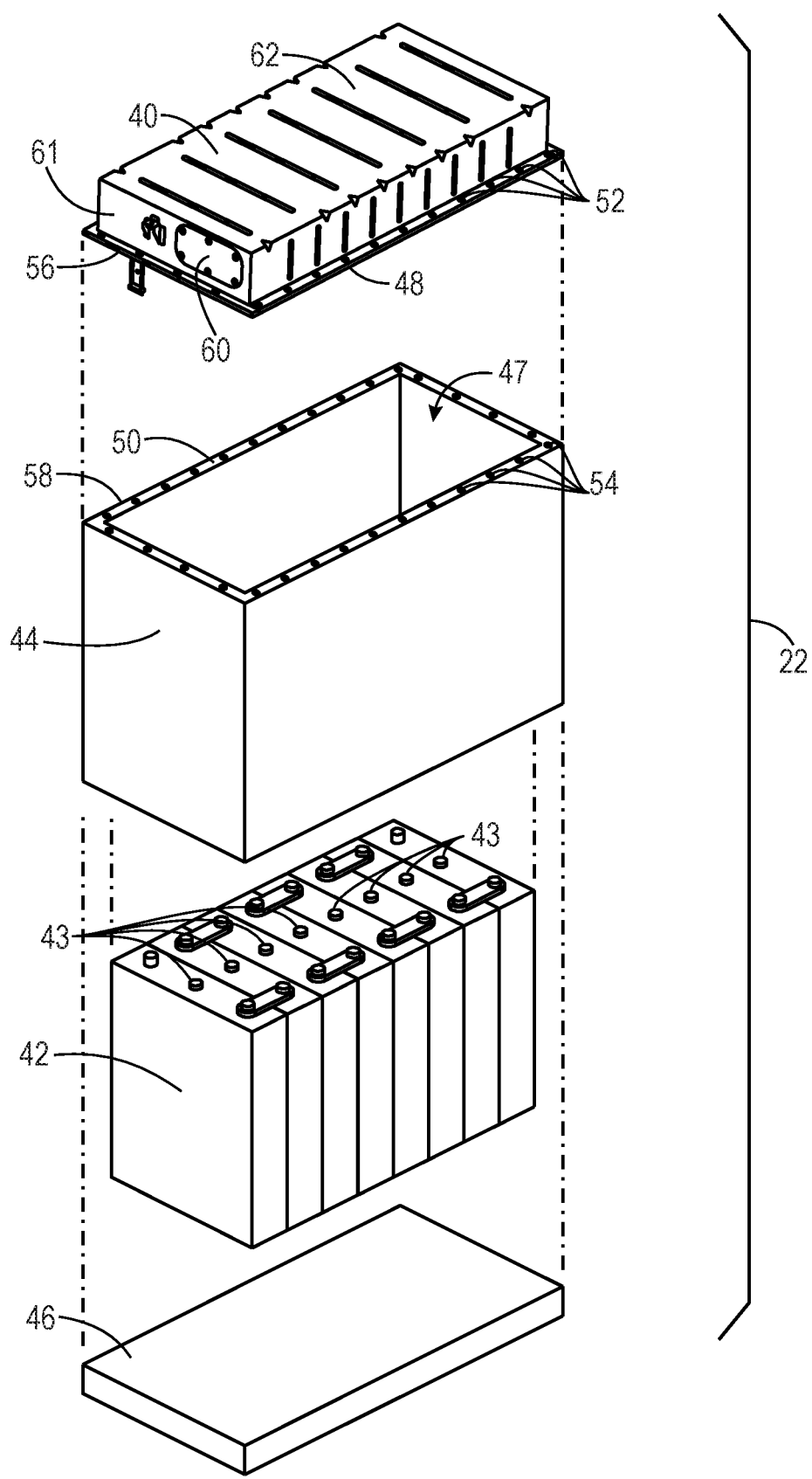
FIG. 3 is an exploded view of an embodiment of the battery module of FIG. 2 having a base, a plurality of electrochemical cells, a housing, and a vent housing, the vent housing being configured in accordance with an embodiment of the present disclosure.

As discussed herein, the battery modules 22 of FIGS. 1 and 2 may each include a respective vent housing 40 configured to enable directional venting of gases, though it is presently contemplated that multiple battery modules 22 (e.g., some or all) may be positioned in an additional housing having the vent housing 40, or some other arrangement where the features described below are incorporated into a module housing or another housing. FIG. 3 depicts an embodiment of the manner in which the vent housing 40 may be positioned relative to other components of a single battery module 22. However, it should be noted that the exploded perspective view in FIG. 3 is provided as an example to facilitate discussion of certain aspects of the vent housing 40, and is not intended to exclude the presence of other battery module features (e.g., a battery control module, service disconnects, terminals, and various thermal management features).

The battery module 22, as shown, includes a plurality of electrochemical cells 42 (e.g., lithium ion electrochemical cells) each having a respective vent 43 to enable a release of gases when an internal pressure of the respective electrochemical cell reaches a certain threshold. The illustrated battery module 22 also includes a battery housing 44 (e.g., a lower housing), and a base 46. While shown as separate components, in certain embodiments, the battery housing 44 and the base 46 may be integrally formed (e.g., molded, welded, fabricated) into a single piece into which the electrochemical cells 42 are placed. The battery housing 44 and the base 46 may therefore define a cavity 47 for holding the electrochemical cells 42. The battery housing 44, in general, protects the electrochemical cells 42 from the external environment, may maintain the position of each electrochemical cell 42 relative to the other electrochemical cells 42, and the cavity 47 may define a volume into which the electrochemical cells 42 vent their gases.

To enable the electrochemical cells 42 to be substantially isolated from the environment external to the battery housing 44 (e.g., hermetically sealed), the vent housing 40 may include a first connection surface 48 that substantially matches a shape and size of a corresponding second connection surface 50 of the battery housing 44 (the lower housing). When placed in abutment, the battery housing 44 and the vent housing 40 may be welded or otherwise sealed together, either in addition to or as an alternative to other fastening methods, which may substantially seal the cavity 47.

As may be appreciated, the particular method used to seal the battery housing 44 and the vent housing 40 may depend on their material construction. For example, the vent housing 40 and the battery housing 44 may be partially or totally formed from any appropriate housing material, such as sheet metal, plastic, or the like. Indeed, while the present approaches may benefit from the vent housing 40 and the battery housing 44 both being formed from sheet metal, for example due to a relatively higher strength and lower gas permeability compared to most plastic materials, it is presently contemplated that a combination of materials may be used. For instance, the first and second connection surfaces 48, 50 may be formed from a different material than other parts of the vent housing 40 and the battery housing 44, respectively, depending on the particular method desired for forming a seal between the two. Furthermore, in certain embodiments, the first connection surface 48 and/or the second connation surface 50 may include a gasket or similar feature to enable the first and second connection surfaces 48, 50 to be securely fit to one another before an additional sealing operation.

In this regard, the particular size and shape of the vent housing 40, and at least the first connection surface 48, may vary depending on the particular shape and size of the battery housing 44, where the shape and size of the battery housing 44 is generally determined based on the shape, size, arrangement, and number of electrochemical cells 42 and other battery management features. Further, the battery housing 44 may have a similar geometrical arrangement to that shown for the vent housing 40, where the first connection surface 48 is defined by a lip extending around the entire perimeter of the vent housing 40 on a side where the vent housing 40 meets the battery housing 44 (i.e., the lower housing). In other embodiments, the size of the battery housing 44 may be bigger or smaller than the connection surface 50. In other words, the connection surface 50 may be a different size than the rest of the battery housing 44, so that the connection surface 48 of the vent housing 40 matches the connection surface 50 of the battery housing 44 to form a tight seal.

As an example operation to connect these components, the electrochemical cells 42 may be positioned within the battery housing 44, and the vent housing 40 may be placed above the battery housing 44 such that the first connection surface 48 and the second connection surface 50 are substantially matched in position. The first and second connection surfaces 48, 50 may then be welded together, brazed together, ultrasonically welded together, adhesively sealed together, and so forth. In certain embodiments, the resulting battery module 22 may be purged of ambient air using an inert gas such as helium or nitrogen, or any other sufficiently unreactive gas, such that the cavity 47 is filled with the gas at an internal pressure. Accordingly, when the electrochemical cells 42 vent gases out of their respective vents 43, the internal pressure of the battery module 22 increases. As described below with respect to FIGS. 3-6, the vent housing 40 includes a number of venting features to resist rupturing the battery module 22 as a result of this increase in internal pressure.

In addition to, or as an alternative to, forming a seal between the vent housing 40 and the battery housing 44, the vent housing 40 may be attached to the battery housing 44 using fasteners 52 such as clips, screws, bolts, pins, ties, and the like. The vent housing 40 and the battery housing 44 may therefore include corresponding openings or other attachment points 54 (e.g., as shown with respect to the battery housing 44), such as threaded openings for screws and/or bolts. In the illustrated embodiment, the fasteners 52 may secure the vent housing 40 to the battery housing 44 at attachment points 52 by bolting or screwing the fasteners 52 into the attachment points 54. The fasteners 52 and the attachment points 54 may be positioned at locations partially or entirely around respective perimeters 56, 58 of the first and second connection surfaces 48, 50. Thus, the fasteners 52 and the weld (or other appropriate attachment method) seal the vent housing 40 to the battery housing 44 so that the inside of the battery module 22 is substantially isolated from the environment (outside of the battery module 22), except for certain vent features of the vent housing 40 as explained in detail below.

Certain of the venting features, for example those discussed with respect to FIGS. 4-6, may be covered by a face plate 60. The face plate 60 may be configured to, itself, serve as an undirected venting feature (i.e., for relatively non-directional venting). For example, the face plate 60 may be secured (e.g., fastened) to the vent housing 40 in a manner that enables slow venting of gases and, in certain embodiments, enables the face plate 60 to serve as a vent. For instance, the face plate 60 may cover an opening in a surface 61 of a main body 62 of the vent housing 40 (e.g., a surface oriented generally crosswise to the first connection surface 48), and may be secured to the surface 61 using a retention force that enables the face plate 60 to allow the opening to be partially exposed and enable vented gases to escape. For example, the face plate 60 may enable venting around its perimeter in a non-directionally controlled manner, such as between the features that fasten the face plate 60 to the vent housing 40.

An example configuration of the face plate 60 and other various venting features of the vent housing 40 is shown in FIG. 4. In particular, FIG. 4 depicts an embodiment of the vent housing 40 including the face plate 60 secured to the main body 62, and a lip 64 having the first connection surface 48 and extending from the main body 62. As illustrated, the face plate 60 is coupled to the vent housing 40 at a first face 66 (e.g., having the surface 61) positioned, for example, at a longitudinal end 67 of the vent housing 40. The first face 66 may, in certain embodiments, be on the same side of the vent housing 40 where various electrical connection points for the xEV 10 (FIGS. 1 and 2) are positioned. The electrical connection points are not particularly limited, but may include, for example, a first electrical connection point 68 and a second electrical connection point 69, which may connect to a service disconnect of the battery module 22 (e.g., to disconnect the electrochemical cells 42 from the xEV 10), a ground of the xEV 10, battery terminal connectors of the xEV 10, and so forth. While the face plate 60 is illustrated as being connected to the vent housing 40 at only one face, it should be noted that the vent housing 40 may, in other embodiments, include multiple face plates secured to the vent housing 40. In certain embodiments, the multiple face plates may be fastened at different retention forces to the vent housing 40 to enable venting at incremented pressures. In other words, multiple face plates on the vent housing 40 may be provided to enable staged venting (e.g., if multiple electrochemical cells begin to rupture). Again, the positioning of the face plate 60 may be chosen to direct vented gases in a predetermined area, such as away from the passenger cabin of the xEV 10 and other certain components of the xEV 10, but in a non-directional manner out of the space between the vent housing 40 and the face plate 60.

The retention force of the face plate 60 to the first face 66 may be at least partially determined by, for example, the type and number of fasteners 70 used to secure the face plate to the first face 66. The fasteners 70, as illustrated, are screws that screw directly into the first face 66 of the main body 62, and may be chosen based on their diameter, number and degree of turn, and so forth, depending on the desired retention. The fasteners 70, in other embodiments, may additionally or alternatively include bolts, pins, nails, snaps, or other attachments.

As depicted, the face plate 60 may be attached to the first face 66 in an undirected manner that allows vented gases 71 to be released from unsealed regions between the face plate 60 and the first face 66 (e.g., spaces between the fasteners 70). In this regard, it is presently contemplated that the amount of separation between the face plate 60 and the face 66 may be adjusted to regulate the amount of vented gases 71 that escape. Further, releasing the vented gases 71 in this manner also enables the gases 71 to be vented in a certain area of the battery module 22.

While the face plate 60 illustrated in FIG. 3 is a flat, continuous surface, and non-directionally vents gases, the embodiment of the face plate 60 in FIG. 4 also includes a hose connection assembly 72. The hose connection assembly 72 is configured to directionally release the vented gases 71 into a corresponding vent hose of a vehicle (e.g., the xEV 10 of FIGS. 1 and 2) when the pressure inside the battery module 22 is higher than a burst threshold of an internal burst vent (discussed in further detail below) of the vent housing 40. Thus, the vent housing 40 may include multiple gas-releasing features configured to directionally discharge the vented gases 71 from the interior to the exterior of the battery module 22. The directionality of venting via the hose connection assembly 72 may be determined by the particular configuration of the hose connection assembly 72 and the connected hose.

For example, as shown in the exploded view of FIG. 5, which corresponds to the embodiment of the vent housing 40 of FIG. 4, the hose connection assembly 72 includes a hose connector 82 disposed in the face plate 60. The hose connector 82 secures a hose to the hose connection assembly 72 to direct the vented gases away from the battery module 22. The hose connection assembly 72 also includes a cover 80 that fits into the hose connector 82 to, for example, place the vent housing 40 in an appropriate state for shipping. As depicted, when the cover 80 is removed from within the hose connector 82, the vented gases 71 are able to escape the battery module 22 in a direction defined by an opening 84 in the hose connector 82. However, to enable further directional venting, in certain embodiments the hose connection assembly 72 enables venting into a connected hose which may extend a distance away from the vent housing 40 and to a desired area for release of the vented gases. The hose connector 82 may connect to the hose, as may be appreciated with reference to the illustration, through an interference or friction fit. In other embodiments, the hose connector 82 may include threaded or hook connection to further ensure a secure connection to the hose.

Returning again to the exploded view of FIG. 5, and moving from the hose connection assembly 72 toward the main body 64 of the vent housing 40, the illustrated embodiment also includes a gasket 86 placed between the first face 66 and the face plate 60. As may be appreciated, the gasket 86 may be configured to provide a tighter seal between the face plate 60 and the first face 66 of the vent housing 40, for example to restrict gas movement between the first face 66 and the face plate 60 in situations where directional venting is desired. The gasket 84 may include or be formed entirely from any suitable gasket material, for example an elastomeric material (e.g., rubber), a metallic material that is more ductile compared to the vent housing 40, etc. On the other hand, in embodiments where non-directional venting from the face plate 60 is desired, the gasket 84 may not be present.

With the face plate 60 apart from the first face 66 and the fasteners 70 out of corresponding fastener seats 88, it can be seen in FIG. 5 that the vent housing 40 may include an internal chamber 90 coupled to an opening 92 in the first face 66. The internal chamber 90 may include, as illustrated, an internal burst vent 94 and a ventilation vent 96. As also shown, the ventilation vent 96 may include a covering 98, which is configured to serve as a gas-selective permeability layer to enable only gases to pass therethrough. For example, the covering 98 may allow certain gases to exit through the ventilation vent 96 while resisting the ingress of moisture or other potentially damaging materials to enter the battery module 22 (e.g., into cavity 47). The ventilation vent 96 having the covering 98 may therefore enable gas exchange between the internal chamber and the cavity 47 of the battery module 22, while preventing the cavity 47 from being exposed to moisture or other debris. The material may include, for example, expanded polytetrafluoroethylene (e-PTFE). As one example, the covering 98 may include a GORE® vent available from W.L. Gore & Associates, Inc. of Newark, Del.

The various features in the internal chamber 90 may be further appreciated with reference to FIG. 6, which shows the internal burst vent 94 and the ventilation vent 96 in greater detail. In the illustrated embodiment, the internal burst vent 94 includes an internal valve 100 having a first valve portion 102 and a second valve portion 104 connected to one another, and retained within the internal chamber 90 by way of a seating 106 having corresponding first and second seating portions 108, 110. As shown, the first and second portions 102, 104 are both annular in shape, but differ in size. In this regard, the retention force of the first and second valve portions 102, 104 may be the same or different, depending on their fits within their respective seating portions 108, 110. In some embodiments, this may enable the first and second valve portions 102, 104 to enable staged release of the vented gases 71 based on incremented pressure thresholds, in addition to any staged venting resulting from partial and total dislodging of the valve portions from their respective seating portions. In one particular embodiment, the second valve portion 104 may be a retaining feature for the internal burst vent 94, which prevents the burst vent 94 from completely dislodging into, for example, a vent hose of the xEV 10. In other words, during an event where the first valve portion 102 is dislodged from its respective seating portion 108, the second valve portion 104 may remain attached to the first valve portion 102 to prevent it from lodging into, for example, the hose connection assembly 72.

In certain embodiments, for example, a rise in internal pressure of the battery module 22 to a first threshold pressure may cause the first valve portion 102 to unseat from the first seating portion 108. The second valve portion 104, on the other hand, may not unseat at this first threshold pressure, thereby restricting the movement of the first valve portion 102 within the internal chamber 90. Further, additional retention features may be positioned on an opposite side of the illustrated valve portions 102, 104 such that the valve portions include flanges, protrusions, or the like, that resist their dislodgement from their respective seating portions 108, 110.

While the internal burst vent 94 is illustrated as positioned on a first wall 112 of the internal chamber 90, the ventilation vent 96 is located on a second wall 114 of the internal chamber 90 oriented crosswise to the first. The ventilation vent 90 may include holes or openings 116, and the covering 98 disposed over the holes or openings 116. Normally, the holes or openings 116 would allow a non-selective exchange of gases, moisture, and so forth, between the internal chamber 90 and the electrochemical cells 42. However, such exchange may be resisted or prevented by the covering 98, which includes gas-selective regions 118 (e.g., windows) formed from a gas-selective permeability layer such as e-PTFE. The gas-selective regions 118 allow only certain gases to pass, and enable a small amount of venting from the internal components of the battery module 22 resulting from, for example, heating and resulting pressure increases. It should be noted that the holes or openings 116 may be sized to prevent objects from entering from the internal chamber 90 and into an electrified region of the battery module 22, such as the cavity 47. For example, the holes or openings 116 may be between approximately 0.1% and 50% of the size of the opening 84 of the hose connection assembly 72, or of the opening left by the first valve portion 102 of the internal burst vent 100.

In view of the foregoing, the operation of the battery module 22 having the vent housing 40 may enable a number of technical advantages. For example, the vent housing 40 may, in certain embodiments, enable directional and/or staged venting of the battery module 22 should one or more of the electrochemical cells 42 rupture or otherwise release gases. In one embodiment of the manner in which the staged venting occurs, one or more of the electrochemical cells 42 may vent causing an internal pressure of the battery module 22 to increase to a first pressure, in turn causing the internal burst vent 100 to open, either partially or totally. Again, the total or partial opening may occur in stages, which may correspond to a first set of stages. Once the internal burst vent 100 has opened, the hose connection assembly 72 disposed on the face plate 60 may enable a directional release of the vent gases 71. Additionally, during normal operation of the battery module 22, the ventilation vent 96 may enable the internal portion (e.g., cavity 47) of the battery module 22 to vent, for example sealing gases, resulting from expected heating of the electrochemical cells 42. In other words, the cavity 47 will generally be at a higher pressure than the environment external to the battery module 22, and the ventilation vent 96 enables certain gases to be released from the cavity 47, into the internal chamber 90, and, in certain embodiments, out of the internal chamber 90 (e.g., between the face plate 60 and the first face 66 or out of the hose connection assembly 72).

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
    a lower housing sized to hold a plurality of lithium-ion electrochemical cells and having a first connection surface; and
    a vent housing configured to couple with the lower housing, comprising:
        a main body having a second connection surface that abuts with the first connection surface;
        an opening in a face of the main body, the face being oriented generally crosswise relative to the second connection surface; and
        an internal chamber coupled to the opening and comprising an internal burst vent and a ventilation vent, wherein the ventilation vent comprises a gas-selective permeability layer, wherein the internal burst vent is disposed on a first wall of the internal chamber, and the ventilation vent is disposed on a second wall of the internal chamber, the first and second wall being coupled to one another and being oriented crosswise to one another.

2. The system of claim 1, wherein the first wall of the internal chamber is generally parallel with the opening, and the internal burst vent comprises a valve disposed in a seating, the valve being configured to displace from the seating in a direction from the first wall toward the opening at a pressure threshold.

3. The system of claim 2, wherein the internal chamber is sized to accommodate the valve displaced from the seating.

4. The system of claim 2, wherein the valve comprises a first portion and a second portion disposed within a first seating portion and a second seating portion, respectively, and wherein the first portion is configured to displace from a seating portion, and the second portion is configured to retain the first portion within the internal chamber after the first portion is displaced from the seating portion.

5. A system, comprising:
a lower housing sized to hold a plurality of lithium-ion electrochemical cells and having a first connection surface; and
a vent housing configured to couple with the lower housing, comprising:
a main body having a second connection surface that abuts with the first connection surface;
an opening in a face of the main body, the face being oriented generally crosswise relative to the second connection surface; and
an internal chamber coupled to the opening and comprising an internal burst vent and a ventilation vent, wherein the ventilation vent comprises a gas-selective permeability layer; and
comprising a face plate secured to the face of the vent housing and over the opening.

6. The system of claim 5, comprising a hose connection assembly disposed in the face plate, the hose connection assembly comprising a hose connector secured to the face plate, wherein the hose connector is configured to connect to a vent hose of a vehicle.

7. A system, comprising:
a lower housing sized to hold a plurality of lithium-ion electrochemical cells and having a first connection surface; and
a vent housing configured to couple with the lower housing, comprising:
a main body having a second connection surface that abuts with the first connection surface;
an opening in a face of the main body, the face being oriented generally crosswise relative to the second connection surface; and
an internal chamber coupled to the opening and comprising an internal burst vent and a ventilation vent, wherein the ventilation vent comprises a gas-selective permeability layer;
wherein the lower housing, the vent housing, or a combination thereof, is made of sheet metal; and
comprising a gasket positioned on the first connection surface, the second connection surface, or a combination thereof.

8. A system, comprising:
a lower housing sized to hold a plurality of lithium-ion electrochemical cells and having a first connection surface; and
a vent housing configured to couple with the lower housing, comprising:
a main body having a second connection surface that abuts with the first connection surface;
an opening in a face of the main body, the face being oriented generally crosswise relative to the second connection surface; and
an internal chamber coupled to the opening and comprising an internal burst vent and a ventilation vent, wherein the ventilation vent comprises a gas-selective permeability layer;
wherein the lower housing, the vent housing, or a combination thereof, is made of sheet metal; and
wherein the first and second connection surfaces comprise corresponding threaded openings to enable them to be fastened to one another.

9. A system, comprising:
a lower housing sized to hold a plurality of lithium-ion electrochemical cells and having a first connection surface; and
a vent housing configured to couple with the lower housing, comprising:
a main body having a second connection surface that abuts with the first connection surface;
an opening in a face of the main body, the face being oriented generally crosswise relative to the second connection surface; and
an internal chamber coupled to the opening and comprising an internal burst vent and a ventilation vent, wherein the ventilation vent comprises a gas-selective permeability layer; and
wherein the first connection surface of the lower housing and the second connection surface of the main body are coupled to one another with at least a weld.

10. The system of claim 9, wherein the first connection surface of the lower housing and the second connection surface of the main body are coupled to one another with fasteners in addition to the weld.

* * * * *